United States Patent [19]

Krieg

[11] Patent Number: 5,032,053
[45] Date of Patent: Jul. 16, 1991

[54] GOODS HANDLING FACILITY AND A METHOD OF OPERATING SAME

[75] Inventor: Walter Krieg, Brugg, Switzerland

[73] Assignee: Gesellschaft fur Roboter und Logistiktechnologie, Rollotec AG, Biel, Switzerland

[21] Appl. No.: 437,284

[22] Filed: Nov. 15, 1989

Related U.S. Application Data

[63] Continuation-in-part of Ser. No. 292,635, Dec. 30, 1988, abandoned, which is a continuation-in-part of Ser. No. 37,975, Apr. 14, 1987, abandoned.

[30] Foreign Application Priority Data

Apr. 16, 1986 [CH] Switzerland ............... 15191/86

[51] Int. Cl.$^5$ ............................................. B65G 1/06
[52] U.S. Cl. ................................. 414/278; 414/280; 414/282; 414/331; 414/416; 414/786
[58] Field of Search ............................. 414/277–283, 414/331, 661, 416, 786, 225, 226, 417

[56] References Cited

U.S. PATENT DOCUMENTS

| | | | |
|---|---|---|---|
| 3,696,949 | 10/1972 | Leblond et al. | 414/331 |
| 4,010,855 | 3/1977 | Smith | 414/280 X |
| 4,203,696 | 5/1980 | Lindberg | 414/281 X |
| 4,383,795 | 5/1983 | Wakamatsu et al. | 414/416 X |
| 4,651,863 | 3/1987 | Reuter et al. | 414/416 X |
| 4,678,390 | 7/1987 | Bonneton et al. | 414/331 X |

FOREIGN PATENT DOCUMENTS

| | | | |
|---|---|---|---|
| 248934 | 12/1965 | Austria | 414/280 |
| 310088 | 9/1973 | Austria . | |
| 2241213 | 3/1974 | Fed. Rep. of Germany . | |
| 48803 | 3/1985 | Japan | 414/280 |
| 77004 | 5/1985 | Japan | 414/280 |

*Primary Examiner*—David A. Bucci

[57] ABSTRACT

A goods handling facility having a storage rack with vertically aligned shelves, storage containers disposed within the racks, a shelf conveying device movable alongside the storage rack, a support frame disposed within the shelf conveying device, and at least one transport frame supported in the support frame with shelves for the storage containers. A charging device for collecting individual storage containers from the storage racks is mounted at the support frame and is displaceable relative to the support frame. Lot forming takes place at a stationary goods removing station from a transport frame deposited thereat. The charging device is adapted to transfer storage containers from the transport frame into the storage rack, and vice versa. At the goods removing station a transport frame is removed from the support frame of the shelf conveying device permitting an exchange of transport frames. The exchanged transport frame is then moved alongside the storage rack. Then individual storage containers for another given lot are collected from the storage racks into the next transport frame.

14 Claims, 10 Drawing Sheets

GOODS HANDLING FACILITY AND A METHOD OF OPERATING SAME

This application is a continuation-in-part of application Ser. No. 07/292,635 filed Dec. 30, 1988, now abandoned, which is a continuation-in-part of application Ser. No. 07/037,975 filed Apr. 14, 1987, now abandoned.

BACKGROUND OF THE INVENTION

1. Field of the Invention

The present invention relates to a goods handling facility for a storage depot having shelves and including storage containers which are retrievable thereout, and having at least one means for conveying shelves and operative to transport storage containers between the storage depot and a goods removing station. The invention relates further to a method of operating said goods handling facility.

Facilities of such design are generally in practical use, for instance, in consignment procedures, i.e. for a readying of articles of a goods or wares depot according to a client's order for a later shipping or for feeding such goods to the production line, etc.

2. Description of the Prior Art

In a commonly known facility of the kind mentioned above a shelf conveying means fetches one respective storage container after the other according to the prevailing order from the depot and conveys it to a goods removing station, at which station such goods are removed and whereby the storage container is deposited thereafter again at the same location. Obviously it is also possible to remove complete containers out of the depot, which containers completely leave the facility.

Such goods handling facilities which are termed also small parts depots incorporate a limited handling facility capacity due to the relatively long passages from the respective deposit location to the goods removing station.

Due to the general trend in the logistic goods chains of the producing and goods distributing industry to reduce the inventories and to carry out the supply within as short as possible time and on time, there is a desire for goods storage facilities having a high handling capacity and a relatively low storage volume.

According to the present state of the prevailing art a high handling capacity necessitates high investment costs because a correspondingly higher number of means for conveying shelves (RFZ) must be employed.

SUMMARY OF THE INVENTION

Hence, it is an object of the invention to provide a goods handling facility of the kind mentioned above, in which the drawbacks set forth above are done away with, i.e. which allows the achieving of an improved cost-capacity ratio.

A further object of the invention is to provide a goods handling facility for a storage depot having shelves, in which the means for conveying shelves are arranged to receive a transport frame for a plurality of storage containers and comprises a charging apparatus operative to convey the storage containers between the storage depot having shelves and the transport frame, which transport frame is retrievable out of the shelf conveying means and reinsertable therein, respectively, at least within the area of the goods removing station.

By means of the invention it is possible to deposit and retrieve, respectively, a plurality of storage bins during one single conveying cycle of the shelf conveying means and accordingly to convey, for instance, a substantially higher number of differing articles in accordance with client's orders to the goods removing station such that a respective client's order can be gathered from the storage containers fed thereto by means of the transport frame. During the retrieving of the individual goods of the respective order out of the transport frame the storage bins at a further storage frame may be already exchanged in accordance with a next following order.

In the claimed method for operating the goods handling facility at least one free place in the transport frame is initially kept open for a storage container. A new storage container to be retrieved is then transferred out of a shelf of the storage depot and then into said free place in the transport frame. As a result an open or free shelf in the storage depot is created. Another storage container from the transport frame, which is to be exchanged, can then be transferred into the free shelf of the storage depot so that a free shelf place in the transport frame is again created. This procedure is repeated until all the storage containers in the transport frame which are to be exchanged, are replaced by respective new containers thereby forming a new charging of the transport frame. This further reduces the transport distance of the shelf conveying means and accordingly of the charging time span.

BRIEF DESCRIPTION OF THE DRAWINGS

The present invention will be more fully understood by reference to the following detailed description thereof, when read in conjunction with the attached drawings. This exemplary description is based on a paper consignment facility, in which clients' orders are consigned from a paper depot having, for instance, about 6000 different paper qualities and sizes, respectively. The drawings illustrate in.

DESCRIPTION OF THE PREFERRED EMBODIMENT

Figure 1:
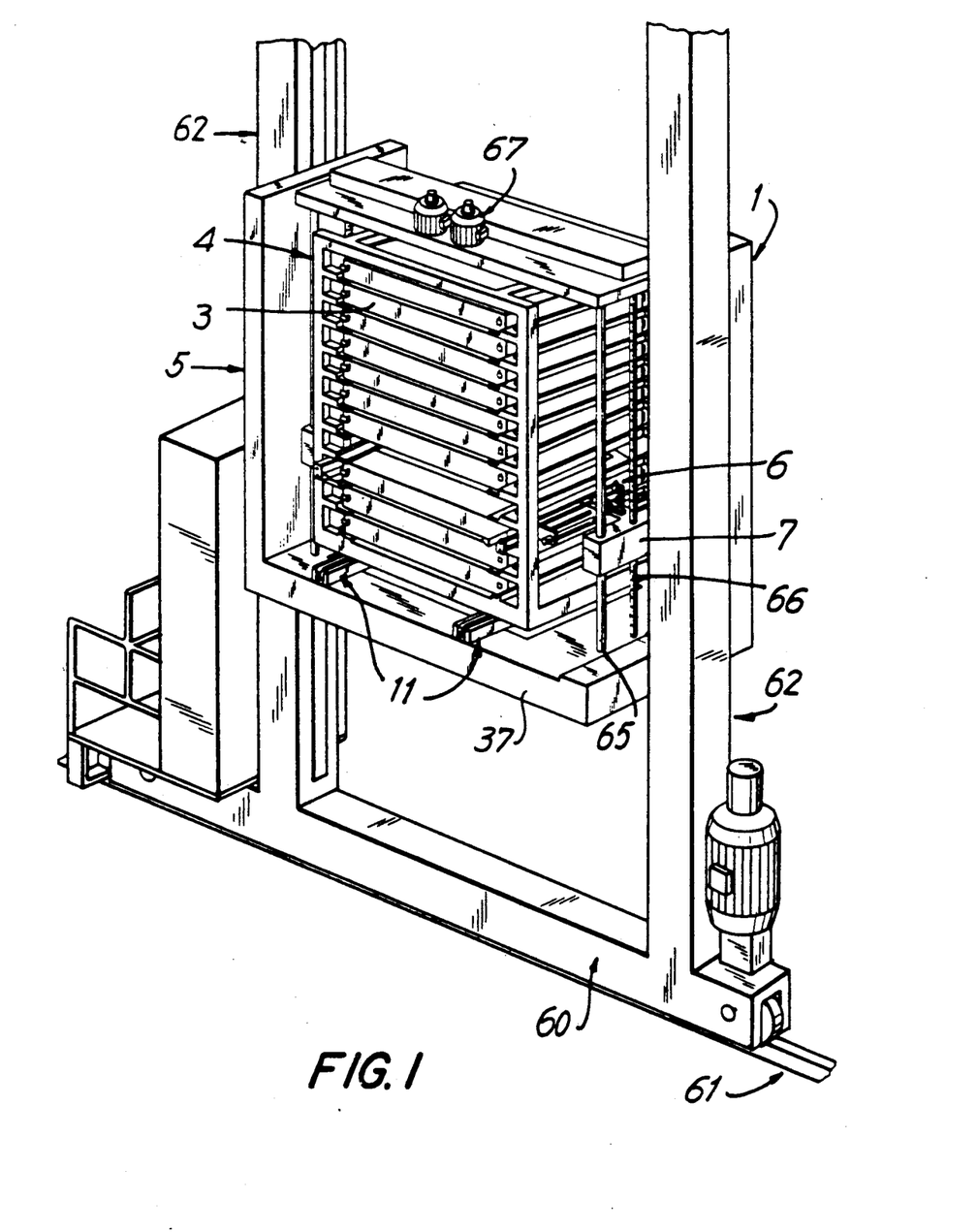
FIG. 1 an inventive shelf conveying means including a transport frame and storage containers inserted therein.

FIG. 1 illustrates a shelf conveying means 1 which is rail supported and moves along the gangway of a high shelf storage depot. This high shelf storage depot not illustrated in this figure comprises storage racks 2 which extend at both sides of the gangway along the gangway and include shelves, into which storage containers 3 can be inserted (see also FIGS. 4a and 4b as well as FIG. 7). The same storage containers are insertable by a corresponding procedure into a transport frame 4, which is removably supported in a supporting framework 5 of the shelf conveying means 1.

The shelf conveying means 1 which is known as such in the prior art comprises a carriage 60 which is displaceable along the gangway between the storage racks 2 on rails 61. From the carriage 60 two columns 62 extend in upright direction. The columns 62 contain driven endless chains (not shown), at which the supporting framework 5 is suspended on either side. The supporting framework 5 therefore forms an elevator which is vertically displaceable along the columns 62.

During the charging operation the transport frame 4 forms a functional part of the shelf conveying means 1 because the storage containers 3 are slidable by means of a charging apparatus 6 directly out of the shelves of the storage racks 2 into the transport frame 4 and thereafter are transported or conveyed, respectively, therein.

The charging apparatus comprises a vertically movable carriage 7 on either side of the supporting framework 5. Each carriage 7 is vertically guided by two vertical rods 65 and is vertically positioned by a rotatable self-locking spindle drive 66. The spindle drives 66 are driven by motors 67 located on the top of the supporting framework 5. The vertical position of the vertically movable carriages 7 within the supporting framework 5 thereby is adjusted to any desired height by correspondingly operating the motors 67. If the motors 67 are not energized, the carriage 7 is blocked in its vertical position by the self-locking spindle drives 66.

Figure 10A:
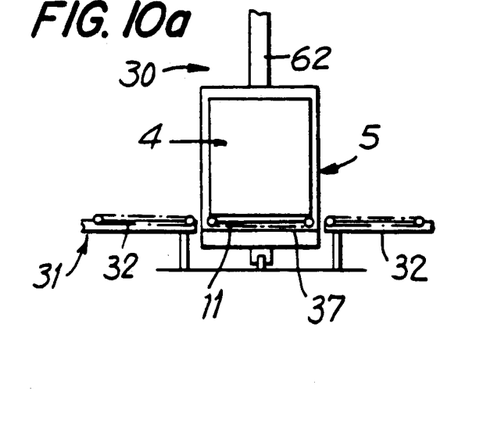
FIGS. 10a and 10b a schematic first embodiment of an exchange station with a shelf conveying means which carries a support framework with its transport frame contained therein.
Figure 10B:
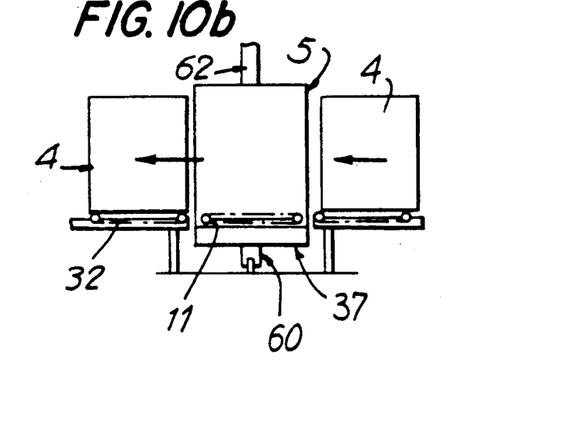

The charging apparatus 6, such as is best shown in FIG. 8, comprises at both sides one telescope-like extendable gripping member 8 which can engage into corresponding projections 9 provided at the respective storage container 3 such to slide or move the storage container 3 out of the transport frame 4 into a storage rack and vice versa. The gripping members 8 are located on carriages 7 which are vertically positionable to the respective storage containers 3 and can be retrieved outwards during the vertical displacement as well as for the retrieving of the transport frame 4 out of the supporting framework 5. The transport frame 4 comprises a frame, which at both sides is open towards the storage racks 2 and includes a plurality of bays located above each other, into which bays the storage containers 3 may be slid into. The frame comprises openings 10 facing the gripping members 8 of the charging apparatus and the gripping members 8 can extend through these openings 10 to engage into the respective shelf. The transport frame 4 stands in the supporting framework 5 on a conveying means, by means of which it can be taken out of the shelf conveying means. To this end two alternatives are foreseen, both of which are illustrated in the figures. Referring now also to FIG. 10, the first illustrated alternative incorporates a chain conveyor 11 located at the floor of the supporting framework 5, which during the retrieving of the transport frame 4 cooperates with a corresponding chain conveyor 32 located at a removing or inserting ramps or platforms 31. The transport frame 4 is moved by means of the chain conveyor 11 out of the shelf conveying means and onto the adjacent chain conveyor 32.

Figures 2A, 3:
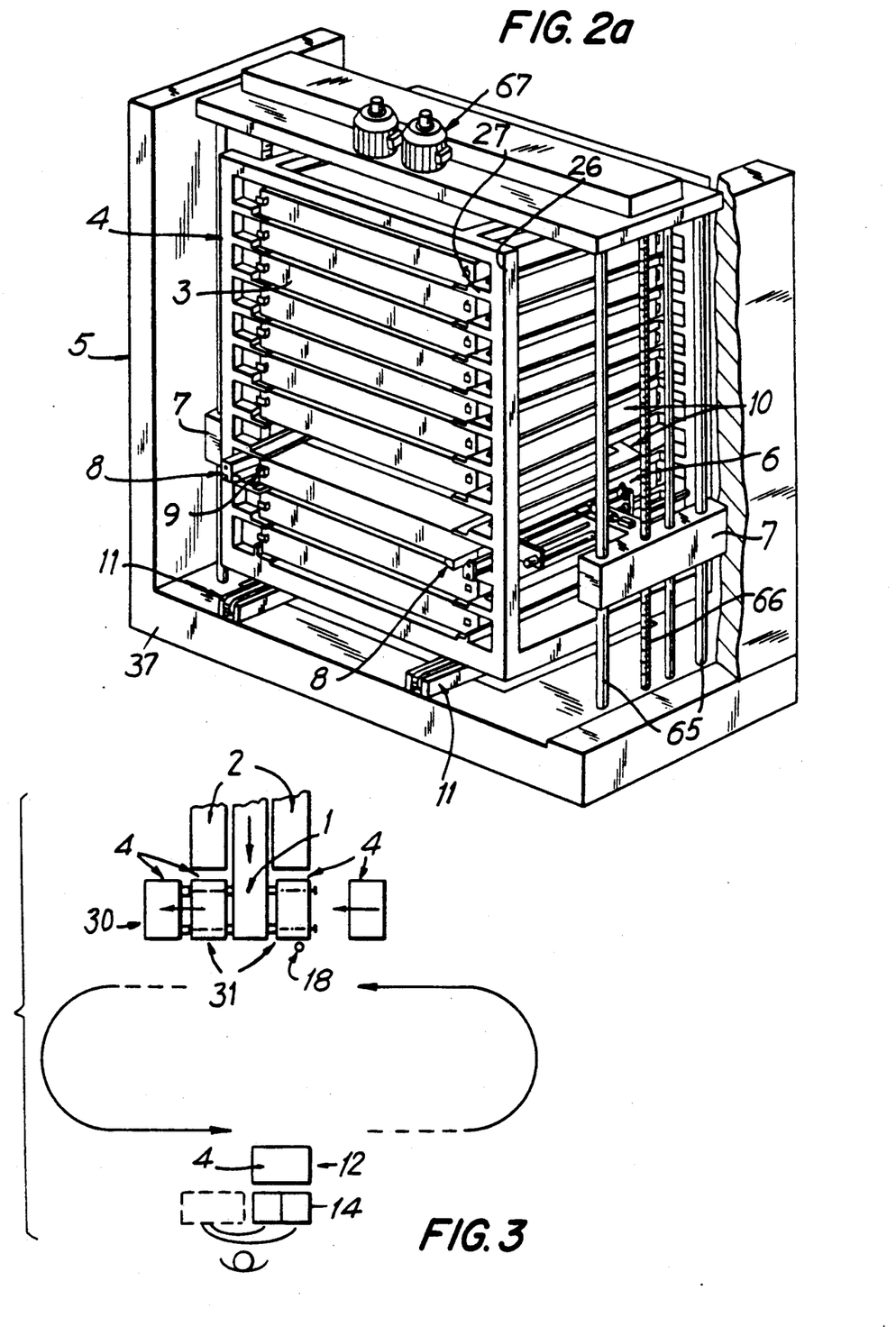
FIGS. 2a and 2b a detailed and enlarged view, respectively, of the supporting framework of the shelf conveying means illustrated in FIG. 1.
FIG. 3 a schematic view of the operational procedure at the goods removing station.
Figure 2B:
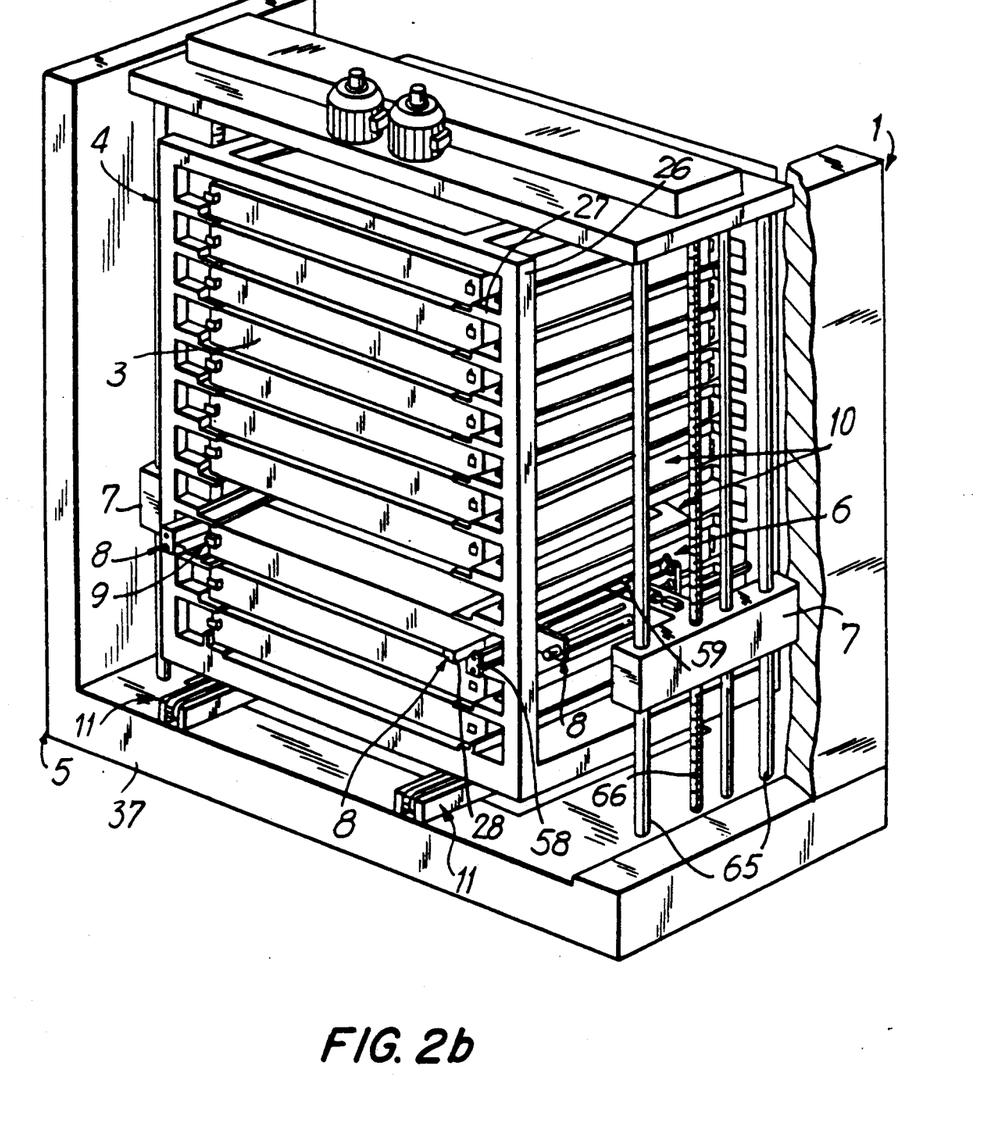

This first alternative is shown in FIG. 2 and in FIGS. 10a and 10b. The supporting framework 5 comprises a chain conveyor 11 (FIG. 2) with two driven chains mounted at the base plate 37 of the supporting framework 5. The transport frame 4 rests upon this chain conveyor 11. Similarly an exchanging station 30 comprises a platform 31 with a corresponding chain conveyor 32 (FIG. 10). The platform 31 is located adjacent to the gangway of the supporting framework 5, preferably on both sides thereof. For exchanging the transport frames 4, the supporting framework 5 is positioned relative to said platform 31 so that the chain conveyor 11 of the supporting framework 5 and the chain conveyor 32 of the platform 31 are aligned as shown in FIG. 10a. Then both chain conveyors 11, 32 are driven to displace the transport frame 4 from the supporting framework 5 to the left platform 31 and to replace the transport frame 4 by another one from the right platform 31 as is also shown in FIG. 10b.

The second alternative, illustrated in FIGS. 11 to 14 of the drawings, comprises for the same object a telescoping forked element or device generally referred to as 34 which is a conventional device and is located in the supporting framework 5. In this case the supporting framework 5 can be designed at its bottom side in accordance with the standard measurements of an European palette. Accordingly the transport frame 4 can be pushed by means of the telescoping fork 34 directly onto an extraction or removing ramp or platform 33.

Figure 11A:
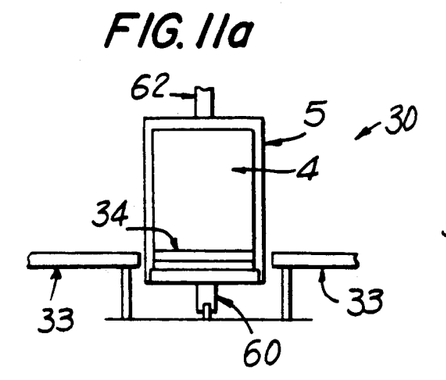
FIGS. 11a through 11d a schematic second embodiment of the exchange station as shown in FIG. 10 including four phases of an exchange operation.
Figure 11B:
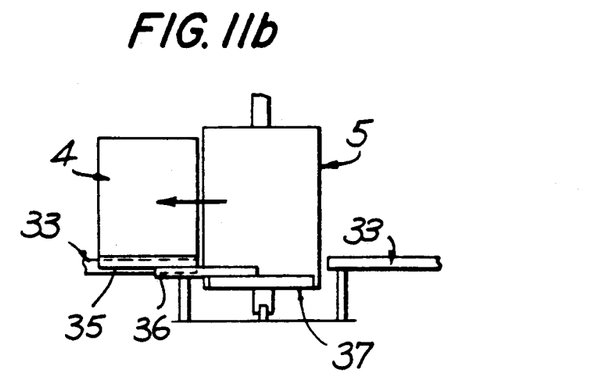
Figure 11C:
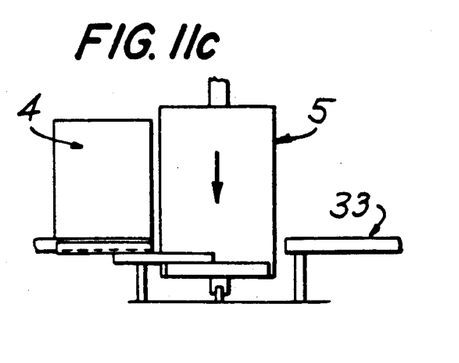
Figure 11D:
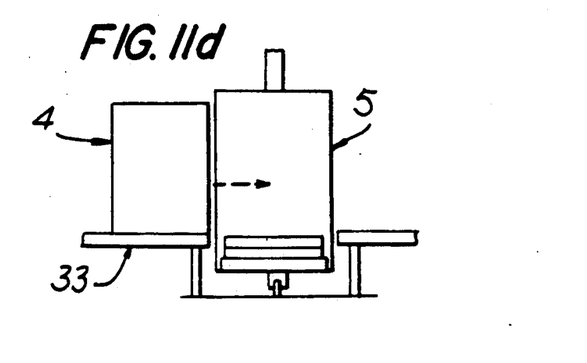
Figure 12:
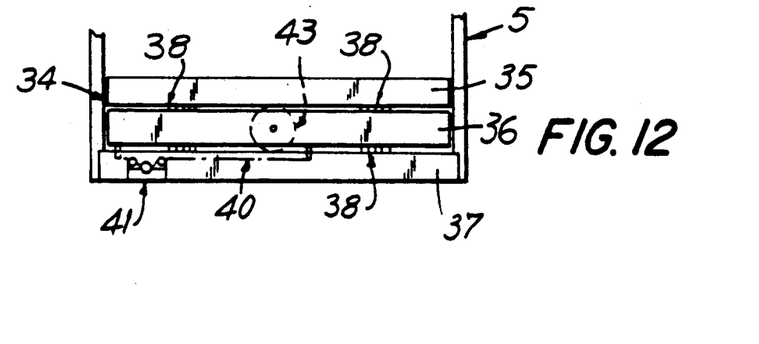
FIG. 12 a schematic side view of the telescoping device shown in FIGS. 11a through 11d in the rest position.
Figure 13:
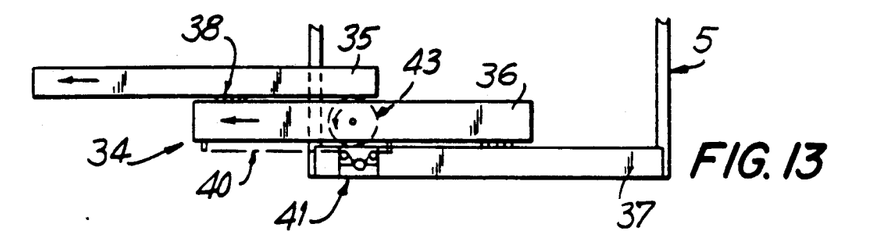
FIG. 13 a schematic side view of the telescoping device of FIG. 12 in its extended position.
Figure 14:
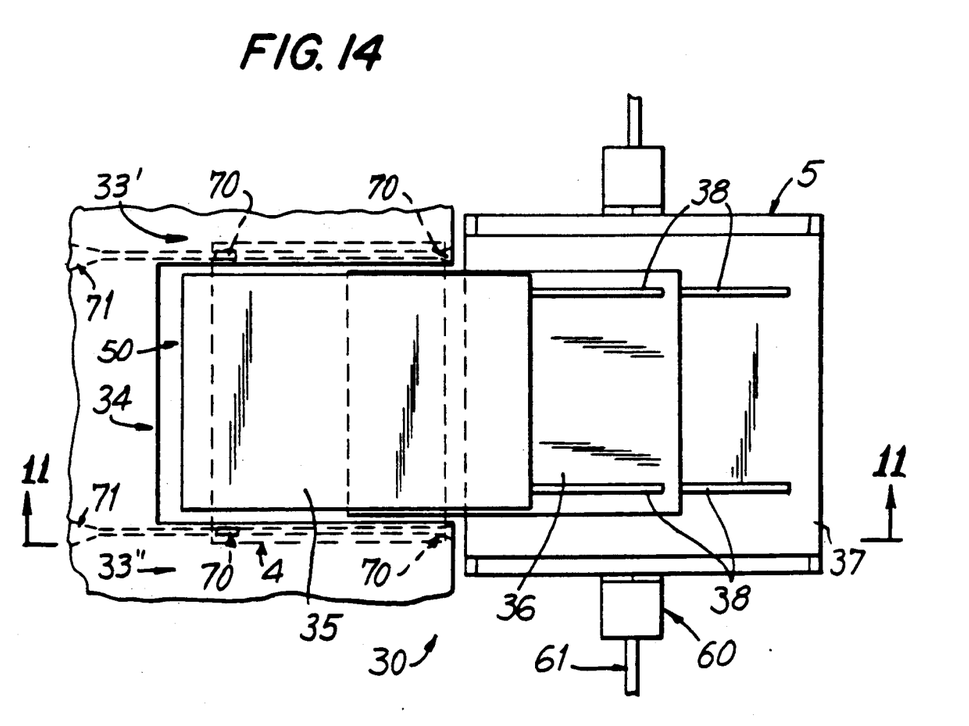
FIG. 14 a schematic top view of the telescoping device of FIGS. 12 and 13 in its extended position including portions of the supporting framework and platform.

The second alternative uses a telescoping device as shown in FIGS. 11 to 14. FIGS. 11a to d exhibit four phases of an exchanging operation of this device. FIG. 12 is a schematic side vie of the telescoping device in its rest position. FIG. 13 is a schematic view of the telescoping device in its extended position, and FIG. 14 is a schematic top view of the telescoping device in its extended position including parts of the supporting framework and the platform 33.

In this second embodiment its exchanging station 30 comprises at least one platform 33 having two sections 33' and 33" (FIG. 14) located adjacent to the gangway of the supporting framework 5 as shown in FIG. 14. Each platform section 33' and 33" has a central opening 50 located between them (See FIG. 14) for introducing a telescoping device generally referred to as 34. The telescoping device 34 comprises an upper and a lower displaceable element 35, 36 arranged on the base plate 37 of the supporting framework 5. Each of the displaceable elements 35, 36 is guided by means of bearings 38 on the underlying element or base plate 37, respectively. The lower displaceable element 36 is driven via a chain 40 by means of a motor 41 mounted to the base plate 37 of the supporting framework 5. The lower displaceable element 36 comprises a transmission wheel 43 rolling on the base plate 37 and being also in contact with the upper displaceable element 35. By the displacement of the lower element 36 the transmission wheel 43 is rotated and displaces the upper displaceable element 35 with respect to the lower displaceable element 36. Turning now to FIG. 11, which shows two platforms 33, the exchanging operation is explained. In a first phase shown in FIG. 11a, the supporting framework 5 is positioned adjacent to the left most platform 33 so that its transport frame 4 is at a height, which is slightly above the level of the platform 33. Then the telescoping device 34 is operated in the above described way to displace the transport frame 4 in a position slightly above and over the platform 33. In a third phase as shown in FIG. 11c, the supporting framework 5 is lowered until the transport frame 4 rests upon the edges of the left most platform 33. Finally, the telescoping device 34 is retracted (FIG. 11d). For picking up a new transport frame the same process is carried out inversely and therefore is not described in detail. As shown in FIG. 14 each platform section 33' and 33" has two short sections of a rail 71 arranged thereon for guiding the caster wheels 70 of the transport frame 4. These rails 71 may be U-shaped or the like.

In either alternative, once the transport frame 4 is removed from its supporting framework 5 on the shelf conveying means 1 to one of its platforms 31 or 33, which platforms constitutes the exchange station 30 (See FIG. 3), it can be rolled on its caster wheels 70 to the extracting station 12 and from there back to the other one of its platforms 31 or 33 of the exchange station 30.

According to this alternative, furthermore, a part of the high shelf storage depot has an area for receiving transport frames 4 which can be moved into this area directly from the shelf conveying means 1. In such case the shelf conveying means 1 can convey on the one hand transport containers from the storage racks or from stored transport racks into the respective transport frame 4 being transported and on the other hand push also the transport rack itself into mentioned area. Finally it can also transport Europe-palettes and store such in mentioned storage area such that the facility incorporates a still higher variability. This is specifically advantageous when replenishing emptied storage containers in that a supply of at least the most used articles can be established in mentioned storage area.

Based on FIGS. 3 to 7 a consignment operation will be explained in detail in case of a paper consigning procedure. In case of different articles the operation will remain correspondingly the same.

Figures 6, 7:
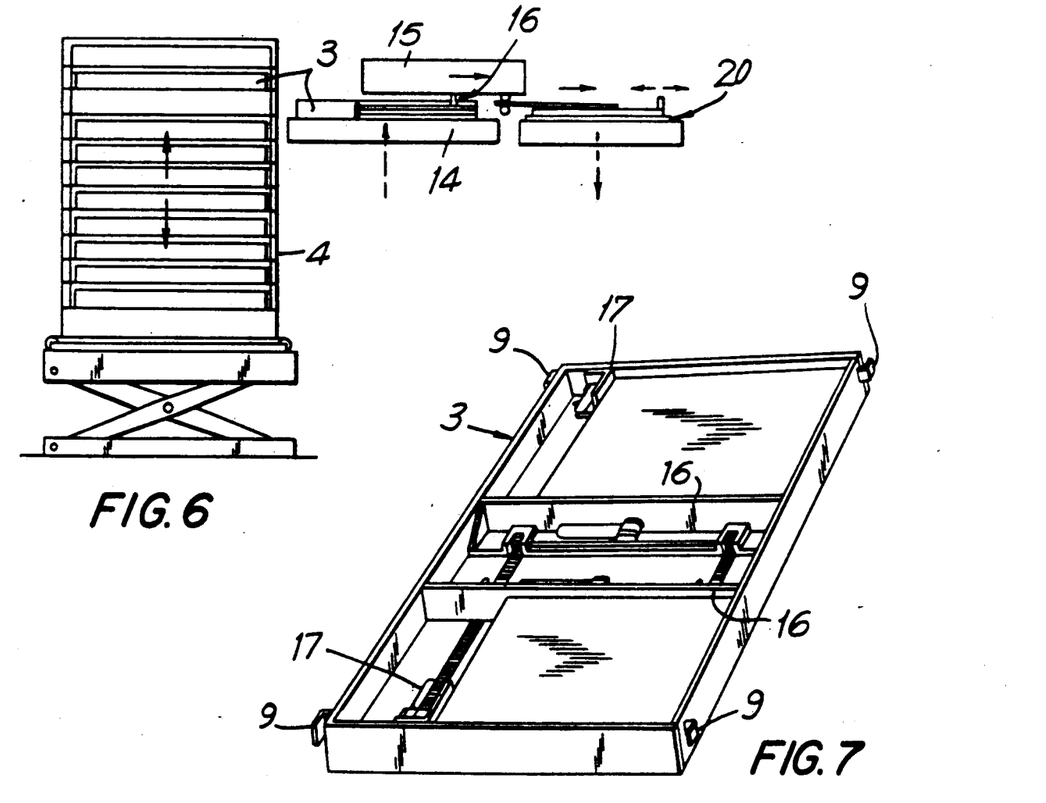
FIG. 6 an automatic removing station at the goods removing place.
FIG. 7 a perspective view of a storage cover having adjustable partitions.
Figure 8A:
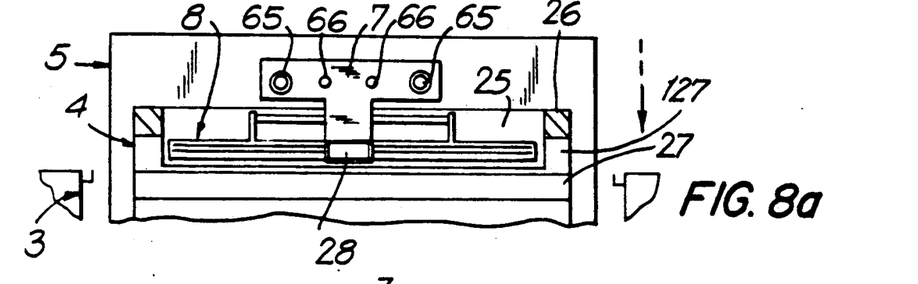
FIGS. 8a to 8e a plan view of a charging apparatus in various operative positions.
Figure 8B:
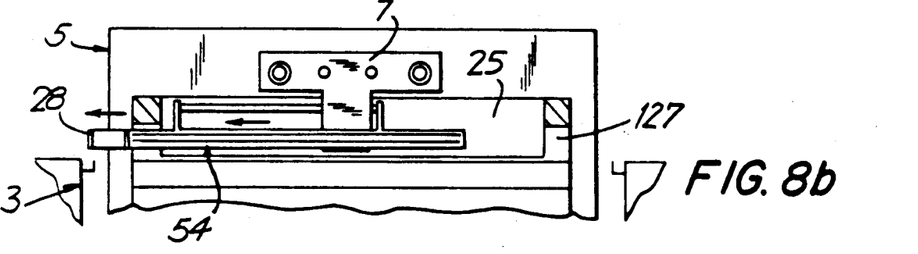
Figure 8C:
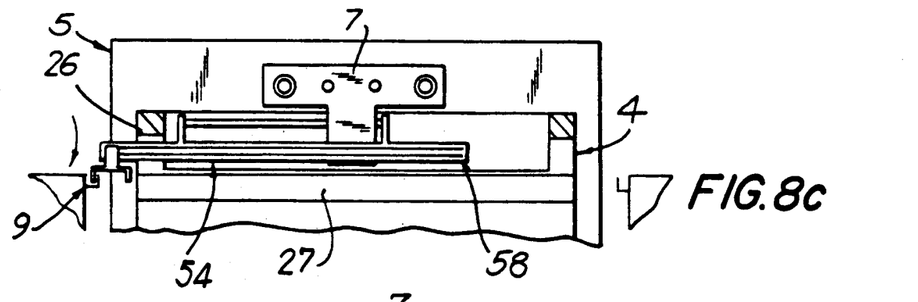
Figure 8D:
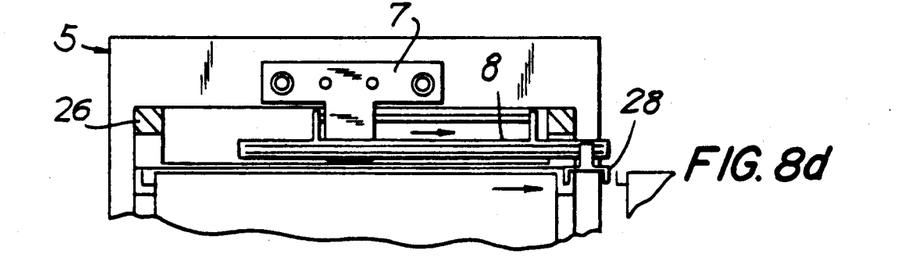
Figure 8E:
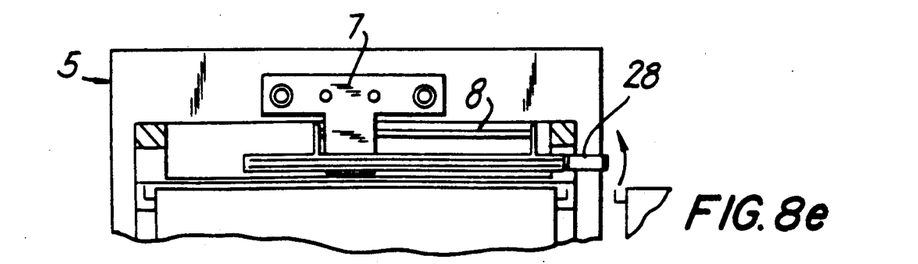
Figure 9A:
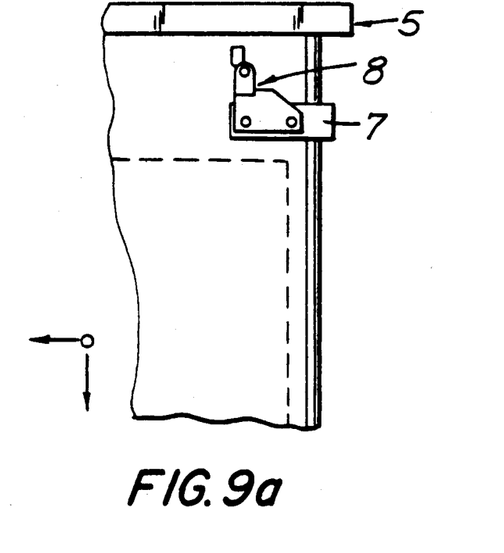
FIGS. 9a to 9d a side view of the charging apparatus in various operative positions.
Figure 9B:
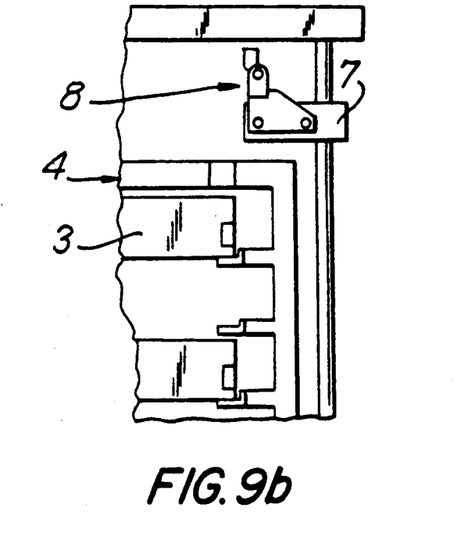
Figure 9C:
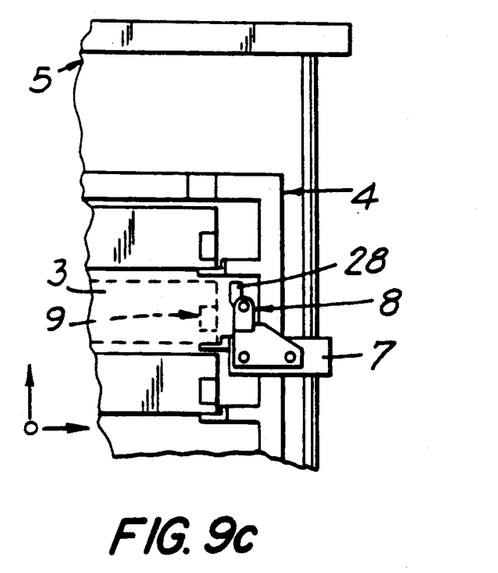
Figure 9D:
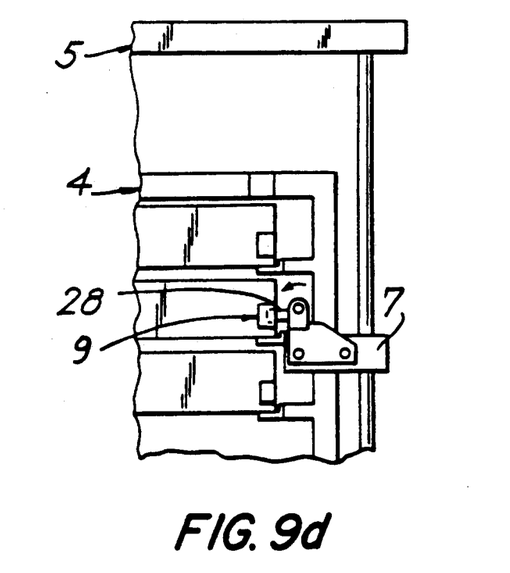

FIG. 3 illustrates schematically the storage depot and its storage racks 2 and the goods removing station 12 which is located away from the storage depot. Transport frames 4 which are loaded in accordance with the respective client's orders are subsequently delivered from storage racks 2 of the storage depot by means of the shelf conveying means 1. The respective needed transport frame 4 including the correspondingly selected storage containers 3 is conveyed or transported, respectively, to a manually operated (FIG. 5) or mechanically operated (FIG. 6) extracting or removing, respectively, station 12. At such station one storage container 3 after the other is pulled out of the transport frame 4 and onto a working table 14, whereafter the corresponding number of articles in accordance with the prevailing order is retrieved manually (FIG. 5) or mechanically (FIG. 6). Specifically, in place of the manual alternative a bar code reader 15 (schematically) may be provided which cooperates with a bar code arranged on the storage containers 3 and controls their position during the reinserting of the retrieved storage containers 3 into the transport frame 4 to avoid mixups. The mechanical retrieving apparatus illustrated in FIG. 6 is in this embodiment designed specifically for retrieving paper sheets and comprises a contact member 115 including a vacuum gripping element 16, by means of which the individual sheets are taken out of the storage container 3 and deposited on a transport plate 20. A storage container 3 designed for storing such paper sheets is illustrated in FIG. 7. It comprises adjustable partitions 16 as well as abutment stops 17, by means of which a respective paper form can be set. In case of smaller forms it is thus possible to locate two piles of paper of a differing or same shape or design in one storage container 3 which increases the storage capacity.

After retrieving the respective transport frame 4 (FIG. 3) it is again received by the shelf conveying means 7 at the exchange station 30. Also the transport frame is identified by a (schematic) bar code reader 18 which is a prerequisite for and facilitates the correct charging operation.

Figure 4A:
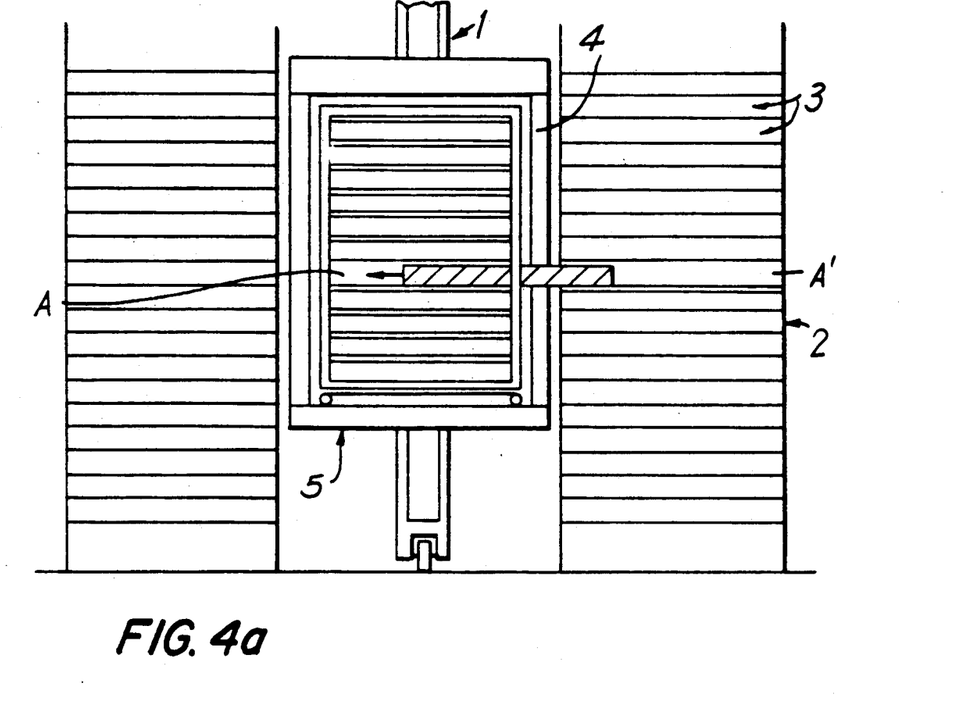
FIGS. 4a and 4b a schematic view of a charging operation.
Figure 4B:
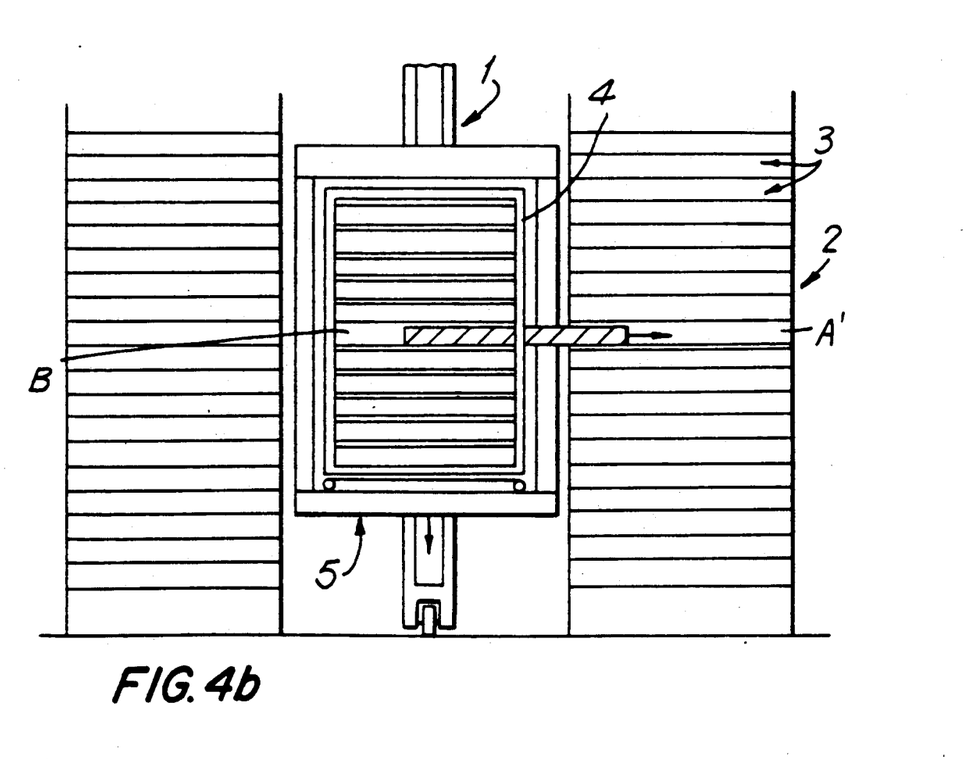
Figure 5:
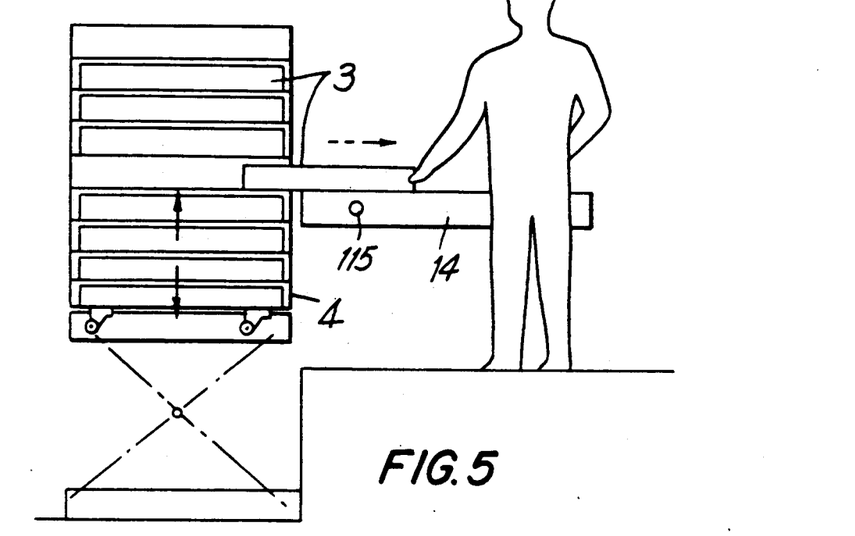
FIG. 5 a manual removing station at the goods removing place.

This operation is illustrated schematically in FIGS. 4a and 4b. In its completely loaded condition the transport frame 4 has one respective free compartment or bay A. At such a charging step initially a new storage container 3 is taken up in this free bay A (FIG. 4a) and accordingly an empty bay A' is produced in the storage depot. During a second step an old storage container 3 is slid out of a bay B and into this empty space A' after the shelf conveying means 1 has made the corresponding vertical displacement. Into the bay B which is now empty another new storage container 3 is received, etc. Preferably the operation proceeds such that the bays A and B are adjoining each other in the transport frame 4 such that the vertical displacing movement of the shelf conveying means 1 remains small leading to a corresponding saving of time. If the operation involves only a storing or only a retrieving, all spaces in the transport frame can be used.

Figure 15:
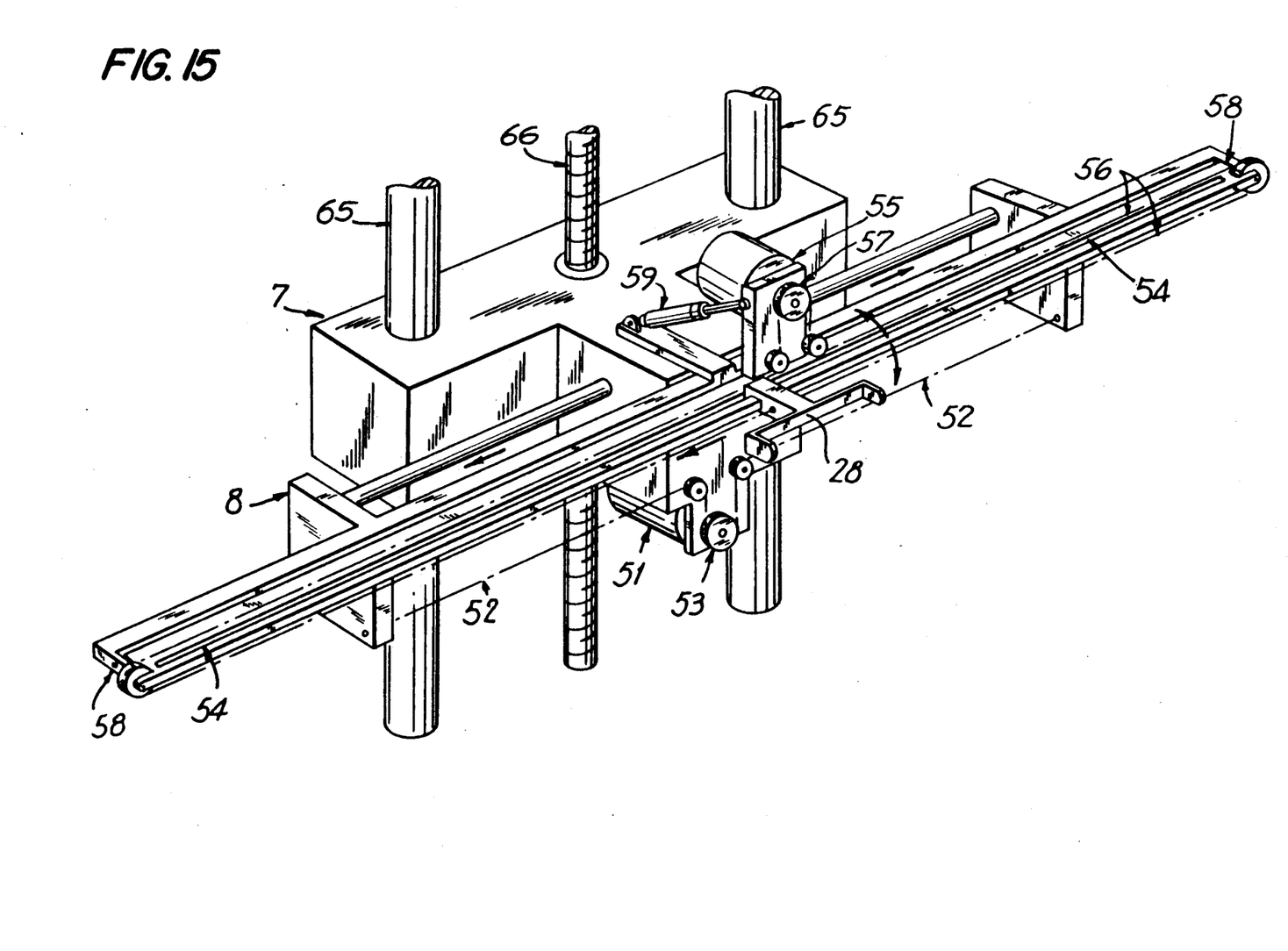
FIG. 15 a detailed perspective view of the charging apparatus shown in FIGS. 8 and 9.

The particulars of the charging apparatus and its operation for the storage containers 3 can be seen specifically clearly in FIGS. 8 and 9 and in great detail in FIG. 15. FIG. 8 illustrates a plan view of one side part of the supporting framework 5 including the transport frame 4 located therein as well as the charging apparatus in five operational phases a to e. The vertically movable carriage 7 of the charging apparatus supports the gripping member 8 which is telescopically movable towards the shelf storage depot, which gripping member 8 includes a gripper 28 which is pivotably mounted to the gripping member 8. At its side the transport frame 4 is designed such that horizontal struts 127 have formed thereon insertion ledges 27 for the storage containers 3 are laterally staggered inwards towards the vertical struts 26 such that a channel 25 is formed, from which the gripper 28 inside at the vertical struts 26 of the transport frame can engage the storage containers.

As can be seen from FIG. 15, the vertically movable carriage 7 supports the gripping member 8, which is telescopically displaceable in a sideways direction. For the displacement an electric motor 51 is provided at the carriage 7, by which a chain 52 connected at its both sides to the gripping member 8 is driven via a roller 53. The gripping member 8 comprises a guiding rail 54 on which the gripper 28 is displaceably guided. The gripper 28 is driven by its own electric motor 55 mounted to said guiding rail 54 and an endless driving chain 56 which is fixed to the gripper 28 and guided over the driving roller 57 coupled to the drive shaft of the motor 55. Thereby the gripper 28 can be positioned along the guiding rail 54 independently of the position of the gripping member 8. The guiding rail 54 is pivoted to the gripping member 8 at pivots 58. In order to pivot the gripper for engaging the projections 9 located at the storage containers as shown in FIG. 8 and 9, a pneumatic cylinder 59 is mounted between said guiding rail 54 and said gripping member 8. Upon its actuation the guiding rail 54 and the gripper 28 together are pivoted upwardly or downwardly in order to engage or disengage a respective projection 9 of a storage container 3 as already described and shown in FIGS. 8 and 9.

The operational functions illustrated in FIGS. 8 and 9 show the receipt of a storage container 3 out of a shelf and into a transport frame 4.

FIG. 8 illustrates subsequently the following phases: (a) Positioning of the charging apparatus onto the corresponding bay in the storage depot; (b) Extending the grippers 28 towards the bay; (c) Pivoting of the grippers for engaging the storage container on projections 9 which are located at its corner areas; (d) Pulling the storage container into the the transport frame; (e) Pivoting the grippers upwards.

As can be clearly seen in these Figures, the charging apparatus remains during this procedure substantially within the area of the transport frame 4 which is possible due to the fact that the grippers 28 engage the edge areas of the storage containers which are located in front thereof relative to the storage depot.

FIG. 9 illustrates finally in succession the following phases: (a+b) Insertion of the transport frame 4 into the supporting frame 5; (c) Positioning of the charging apparatus and of the transport frame such that the empty bay in the transport frame 4, the shelf bay including the storage container 3 and the charging apparatus are located in a common plane; (d) Taking the storage container 3 into the transport frame 4 after pivoting the grippers 28. The aforementioned positioning encompasses a plurality of simultaneously proceeding procedures, because on the one hand the supporting framework 5 and on the other hand the charging apparatus at the framework are brought into the desired position and, additionally, because the gripping member 8 can be extended at least partly.

According to this procedure it is possible to load a transport frame 4 within a relatively short time span in accordance with a client's order. Storage containers 3, which have already been taken into the transport frame 4 at a preceding order, must obviously not be exchanged. If the capacity of the facility is to be increased further, it is possible to locate a plurality of charging apparatuses of the design set forth above at the supporting framework 5.

The entire facility is controlled by a computer according to known procedures, whereby the respective position of each storage container 3 having a bar code or other suitable identification is known at all times and may be checked at all times, too.

It is possible, thereby, in the case of a mechanical retrieving (FIG. 6) to control also the consignment step itself by such computer. In such case the contact member 15 retrieves a number of sheets set by the computer and places the sheets onto the transport plate 20 after the corresponding storage container has been pulled out of the transport frame by means of a pulling-out apparatus. After the sheets have been retrieved, the storage container is pushed back into its bay and the transport frame 4 thereafter displaced by one bay distance such to retrieve the next following storage container.

The described consigning apparatus can obviously be used also for wares which are different from paper sheets such as to consign effectively variously differing individual articles from a plurality thereof in a storage depot to fulfill customers' orders having a relatively large number of varying articles.

While there is shown and described a present preferred embodiment of the invention, it is to be distinctly understood that the invention is not limited thereto, but may be otherwise variously embodied and practiced within the scope of the following claims.

I claim

1. A goods handling facility comprising:
   at least one storage rack linearly disposed along a gangway;
   a plurality of vertically aligned shelves of equal dimensions disposed within said storage rack;
   a plurality of storage containers insertable into and removable from said shelves;
   a shelf conveying means movable on said gangway alongside said storage rack;
   a support frame disposed within said shelf conveying means;
   support displacement means for vertically displacing said support frame within said shelf conveying device;
   at least one transport frame supported in said support frame, having a plurality of vertically aligned shelves for inserting said storage containers;
   a charging device mounted at said support frame of said shelf conveying means;
   charging displacement means for vertically displacing said charging device relative to said support frame for collecting individual storage containers from said storage racks; and
   a stationary goods removing station for forming a lot;
   wherein said shelves of said transport frame and said shelves of said storage rack have container transfer openings, said transport frame being adjustable in the horizontal and vertical positions to align said transfer openings of said plurality of shelves of the transport frame with a respective number of shelves of said storage rack such that respective openings of said transport frame and said storage rack face each other;
   wherein by means of said charging device any storage container within one of said plurality of adjusted shelves is slidably transferable directly from said transport frame into said storage rack, and vice versa; and
   wherein at said stationary goods removing station said at least one transport frame is removable from said support frame of said shelf conveying means wherein an exchanged transport frame on said shelf conveying means is moved alongside said storage rack whereby individual storage containers for a given lot are collected therein from said storage racks so as to allow an exchange of transport frames.

2. The goods handling facility of claim 1, wherein said charging device is located at said shelf conveying means and includes gripping members which are insertable into one selected compartment of said transport frame in order to grip a respective storage container, which gripping members are extendable in the direction of said shelves within said storage rack.

3. The goods handling facility of claim 2, in which said transport frame comprises horizontal struts or insertion ledges for storage containers which are displaced relative to vertical struts of said transport frame such that a lateral, vertically extending channel is formed, within which said gripping members are positionable vertically to a height of a respective container to be gripped.

4. The goods handling facility of claim 3, in which said gripping members are part of a gripping apparatus which in gripping of a storage container is telescopically extendable out of said channel towards said storage depot having shelves.

5. The goods handling facility of claim 2, wherein said transport frame has a width in which said gripping members include a gripper each operative to grip a respective storage container at its corner areas, which grippers are arranged to engage the corner areas of a respective storage container located at a front thereof relative to said shelves within said storage racks and are arranged to be displaceable substantially along the width of said transport frame.

6. The goods handling facility of claim 1, in which a number of storage shelves in said transport frame exceeds a number of storage containers to be transported therein by at least one.

7. The goods handling facility of claim 1, in which said transport frame is removable from and insertable into, respectively, said shelf conveying means by a chain conveyor.

8. The goods handling facility of claim 7, in which at said removing station one respective storage container after the other is retrievable out of said transport frame for the removal of goods.

9. A goods handling facility as recited in claim 1, wherein said at least one transport frame is removable from said support frame of said shelf conveying means prior to a lot forming operation at said stationary goods removing station.

10. A goods handling facility as recited in claim 9, wherein the exchanged transport frame on said shelf conveying frame is moved alongside said storage rack whereby individual storage containers for a given lot are collected therein from said storage racks.

11. A goods handling facility as recited in claim 10, wherein the exchanged transport frame on said shelf conveying frame is moved alongside said storage rack whereby individual storage containers for a given lot are collected therein from said storage racks while said lot forming operation continues from said removed transport frame.

12. A goods handling facility as recited in claim 11, wherein said lot forming operation continues from said removed transport frame independent of said collection of individual storage containers from said storage racks.

13. A goods handling facility as recited in claim 11, wherein said lot forming operation continues from said removed transport frame simultaneous with said collection of individual storage containers from said storage racks.

14. A method of operating a goods handling facility having a storage rack with storage containers disposed therein, a plurality of transport means for collecting storage containers therein from said storage rack and a stationary goods removing station at which lot forming operations are performed in accordance with customers' orders, which comprises;

collecting in a first transport means storage containers from said storage rack in accordance with a first customer's order;

moving said first transport means to said stationary goods removing station;

exchanging said first transport means for a second transport means at said stationary goods removing station;

lot forming at said stationary goods removing station from said first transport means in accordance with said first customer's order;

moving said second transport means to said storage rack; and collecting, in a transport means, storage containers from said storage rack in accordance with a second customer's order while said lot forming operation is performed at said stationary goods removing station.

* * * * *